Dec. 17, 1946.    H. E. STOVER    2,412,924
APPARATUS FOR SEALING CONTAINERS
Original Filed Aug. 2, 1940    2 Sheets-Sheet 2

INVENTOR
Harry E. Stover.
BY Corbett, Mahoney + Miller
ATTORNEYS

Patented Dec. 17, 1946

2,412,924

UNITED STATES PATENT OFFICE 2,412,924

APPARATUS FOR SEALING CONTAINERS

Harry E. Stover, Leonia, N. J., assignor to Anchor Hocking Glass Corporation, Lancaster, Ohio, a corporation of Delaware Original application August 2, 1940, Serial No. 349,655. Divided and this application April 17, 1943, Serial No. 483,444

1 Claim. (Cl. 226—80)

My invention relates to an apparatus for sealing containers. It has to do, more particularly, with an apparatus for applying closures to containers, such as food containers and including jars, bottles, cans, et cetera, and sealing them on the containers and for producing a partial vacuum in the upper ends of the containers.

This application is a division of my copending application Serial No. 349,655, filed August 2, 1940, and which issued as Patent No. 2,321,779 on June 15, 1943.

One of the objects of my invention is to provide a sealing machine including a movable sealing unit, wherein novel control means is provided for actuating said unit, said control means being positive and efficient in operation.

Another object of my invention is to provide control means for actuating the sealing unit which is of such a nature that it will be actuated whenever a container with a cap thereon is moved into association with the sealing unit.

My invention is embodied in an apparatus for applying closures to and sealing them on various containers such as jars, bottles, cans, et cetera. The apparatus is in the form of a compact structure which may be disposed in superimposed relationship to a continuously moving conveyer upon which the filled containers are placed at random. The conveyer preferably has means associated therewith for centering and maintaining the containers centered on this conveyer.

The apparatus may include a cap-feeding and applying unit, where caps or other closures are loosely positioned on the upper ends of the containers moved into association therewith by the conveyer. Directly adjacent the cap-feeding and applying unit, a sealing head is provided. The conveyer moves the containers, with caps loosely applied thereto, into association with this sealing head. The sealing head is spaced slightly above the upper ends of the containers and a main fluid-actuated unit is associated therewith for forcing it downwardly whenever a container, having a cap properly associated therewith, moves beneath the sealing head. I provide a positive and efficient control arrangement for starting operation of the sealing head at the proper time.

The control arrangement includes a main control valve for controlling the supply of fluid to the fluid-actuated unit which moves the sealing head. It also includes a pilot valve for controlling the operation of the main valve. The pilot valve is actuated by means of a trigger. This trigger is engaged by a cap on a container when the container is moved into sealing position beneath the sealing head and will, consequently, actuate the sealing head. To return the trigger to its original position, I provide a small fluid-actuated unit which is mechanically connected to the trigger and which is actuated by the first-named fluid-actuated unit.

The preferred embodiment of my invention is illustrated in the accompanying drawings, wherein similar characters of reference designate corresponding parts and wherein.

This application relates to the control mechanism for actuating the sealing head. This case was co-pending with the application of William D. Bell on Apparatus for sealing containers, Ser. No. 314,299, which recently issued as Patent No. 2,352,763 on July 4, 1944. Applicant wishes to direct the attention to this issued patent for a description of the sealing head and conveyer which are adequately described in that patent. It is believed, however, unnecessary to give a complete description of this previously patented machine at this time. The conveyer unit l the cap-feeding and applying unit are clearly described in said patent. The following description is directed to the control mechanism for actuating the sealing head 26.

Figure 1:
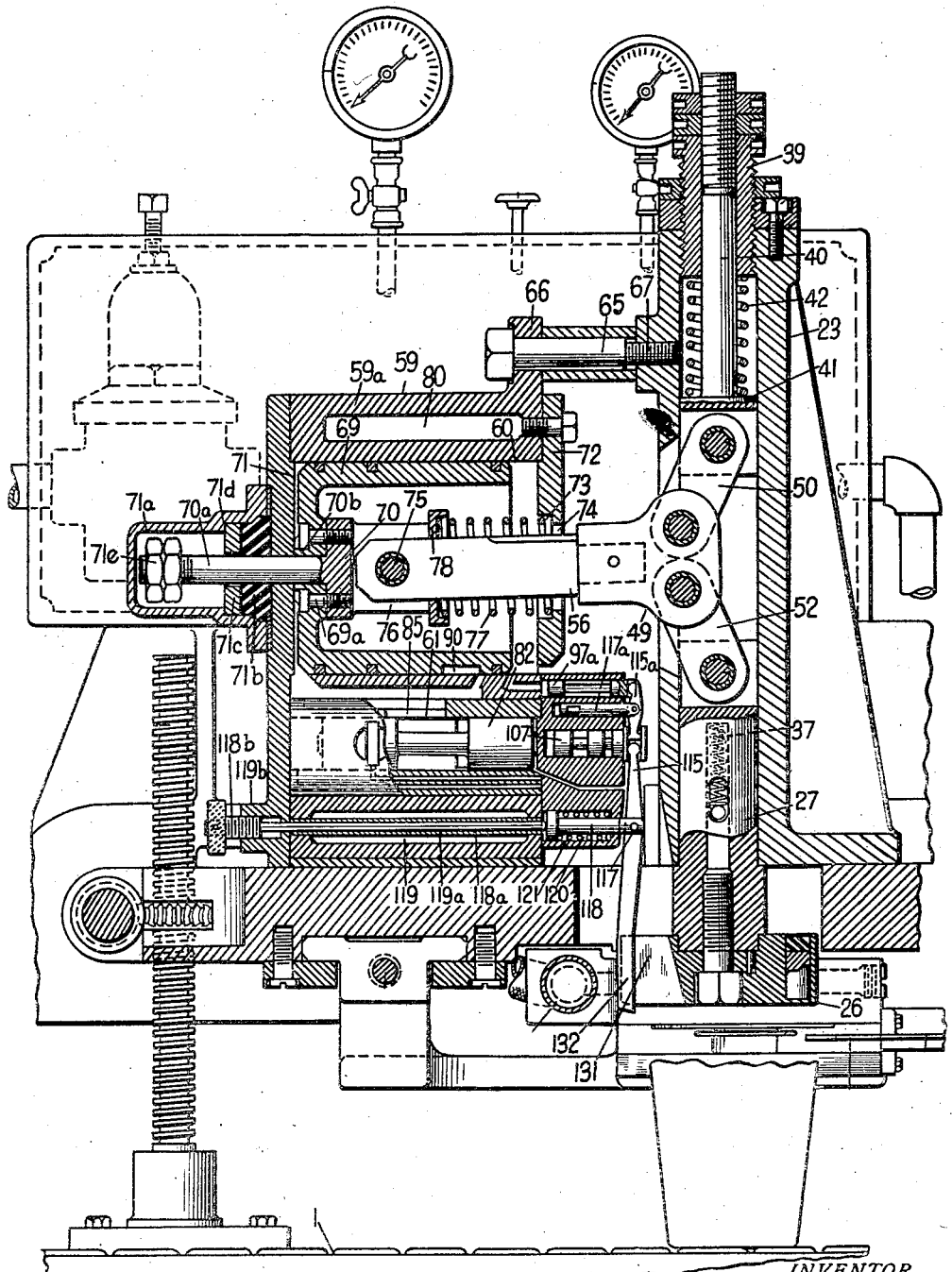
Figure 1 is a longitudinal vertical sectional view illustrating the sealing head unit and its operating mechanism.

The actuating mechanism for the sealing head 26 is normally in the condition illustrated in Figure 1. The plunger 40 will be held in its lowermost position by the spring 42. The plunger 27 will be held in its uppermost position by the spring 37. The toggle joint 49 will be in the condition illustrated, that is, with its links at an angle to each other. It will be apparent that if the piston rod 56 is moved to the right (Figure 1), the toggle joint 49 will be straightened out. This will force the plunger 27 downwardly against the action of spring 37 and, consequently, will force the sealing head 26 downwardly. As soon as the piston rod 56 moves to the left, the spring 37 will return member 26 to its uppermost position. The spring-pressed plunger 40 is provided to limit the downward force exerted on the plunger 27 to a predetermined maximum, so as to prevent injury to the container being sealed. This predetermined maximum is determined by the initial adjustment of the distance between the lower end of collar 39 and the flange 41, which varies the downward force exerted by the spring 42. When the downward force created by the toggle 49 on the plunger 27 reaches the predetermined maximum, the plunger 40 will be forced upwardly against the resistance of the spring 42. Consequently, the pressure exerted on plunger 27 will not be excessive. It will be apparent that during operation of the toggle joint, the piston rod 56 will move vertically to a limited extent. Adjusting the plunger unit vertically by means of the member 39, as previously described, will vary the extent of the downward movement of the plunger 27 and, consequently, of the member 26. Thus, the extent of the downward movement of member 26 may be readily adjusted.

For controlling movement of the piston rod 56, I provide the mechanism now to be described. This mechanism comprises a fluid-operated cylinder and piston unit 59. Thus unit 59 includes a housing 59a which has a large cylinder bore 60 formed in its upper portion and a small cylinder bore 61 formed in its lower portion. The bores 60 and 61 are horizontally disposed and are parallel with each other. The housing 59a is mounted on the upper surface of a plate directly adjacent the housing 23. It is provided with a flattened lower surface which rests on the upper surface of a plate. To secure the housing 59a to the housing 23, the housing 23 is provided with laterally projecting lugs, through which bolts pass. The bolts have their ends threaded into the housing 59a and spacers are provided on the bolts. A large bolt 65 (Figure 1) is passed horizontally through an upstanding lug 66 on the housing 59a and has its outer end threaded into a boss on the housing portion 23, as at 67. A spacer is provided on the bolt 65. Thus, it will be apparent that the housing 59a is held firmly in position.

The bore 60 has a hollow piston 69 slidably mounted therein. This cylinder 69 has a member 70 disposed therewithin which is secured to its end wall by means of bolts 69a. The member 70 has a reduced extension 70a which extends to the left (Figure 1) through the end of the piston and through a boss 70b formed thereon. This boss 70b will normally contact with the end of the bore 60 to keep the piston spaced from the head 71 disposed at the left hand end of housing 59a. The portion 70a extends through the head 71 and into a housing 71a which is secured to the head 71. A cushion member 71b of rubber surrounds portion 70a and abuts the head 71. A metal collar 71c holds the member 71b in position by contacting with a shoulder 71d formed on the inner surface of housing 71a. The end of the portion 70a is threaded to receive nuts 71e which may be adjusted to various positions therealong. The nuts 71e will contact with member 71c when the piston 69 moves to the right. They serve as an adjustable stop for limiting such movement to prevent the links 50 and 52 of the toggle from moving past the axes of plungers 27 and 40. The member 71b serves as a cushion to reduce the shock of the impact.

A cap 72 is bolted to the other end of the housing 59a and is provided with an opening 74. The piston rod 56 passes inwardly through this opening into the interior of the bore 60. The inner end of the piston rod 56 is flattened and is pivotally connected at 75 to a bifurcated lug 76 formed on the member 70. The opening 74 is larger than the piston rod 56 so as to permit limited movement of the piston rod therein. A compression spring 77 is disposed within the bore 60 in surrounding relationship to the rod 56. One end of the spring bears against the cap 72 and is disposed in a recess 73 formed therein while the opposite end bears against a flanged collar 78, which is formed integral with member 70. It will be apparent that this spring normally tends to force the piston 69 to the left so that the boss 70b contacts with the head 71. Consequently, this will also keep the toggle joint 49 in the condition illustrated in Figure 1.

I preferably employ steam as the fluid for moving the piston 69 from the position indicated in Figure 1. The housing 59a has a steam jacket 80 formed in the wall thereof and extending completely around the housing. This jacket serves to prevent or decrease condensation of the steam within the housing 59a.

Figure 2:
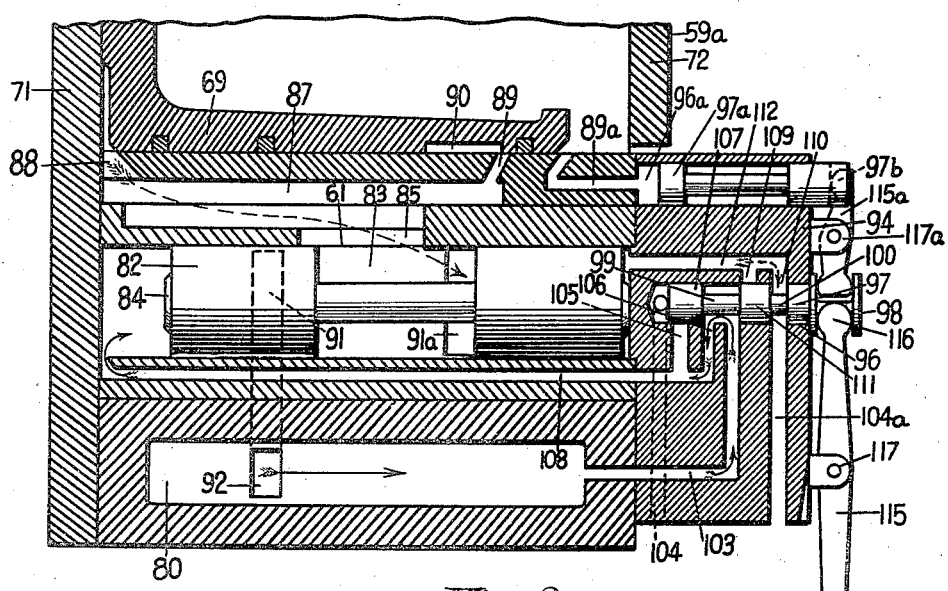
Figure 2 is a vertical sectional view of the valve which is used for controlling operation of the sealing head, the valve being shown in its normal position.
Figure 3:
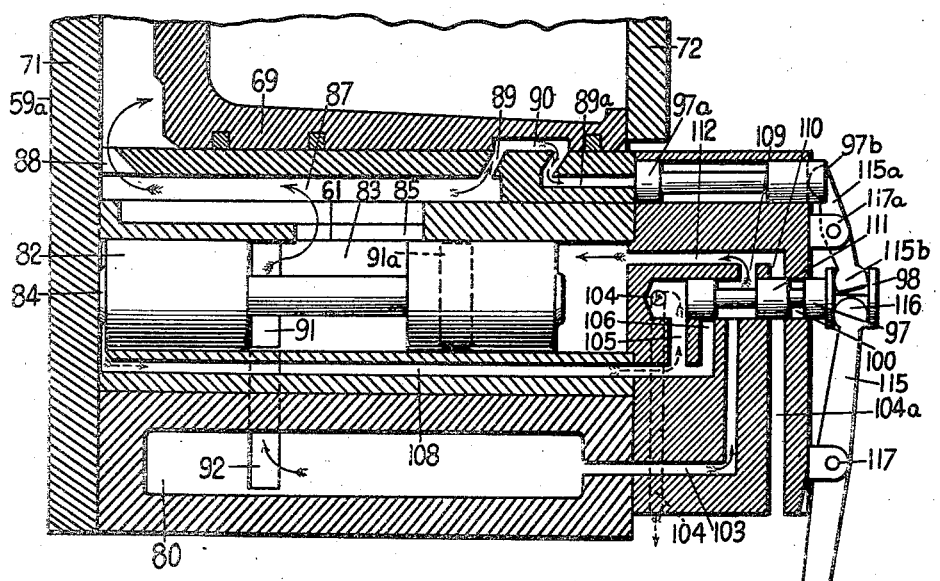
Figure 3 is a similar view but showing the valve in its operative position.

The bore 61 has a piston type valve 82 mounted for axial movement therein, as shown best in Figures 1, 2 and 3. This piston valve 82 is adapted to control the supply of steam to and exhaust of steam from the cylinder bore 60. Intermediate its ends the piston valve 82 is provided with an annular chamber 83 and at its extreme ends the piston valve 82 is provided with projecting portions 84. An exhaust and inlet opening 85 is provided in the wall of the bore 61 intermediate the ends thereof and communicates with a longitudinal passageway 87. Opening 85 is always in communication with annular chamber 83. The passageway 87 has one end communicating with an opening 88 which leads into the cylinder bore 60 adjacent the head 71. The opposite end of the passageway 87 communicates with an opening 89 which leads through the wall of the bore 60. The opening 89 communicates with a longitudinally extending groove 90 formed in the periphery of the piston 69. When the piston 69 is in the position indicated in Figure 8, the opening 89 will not be in communication with a passageway 89a, formed in the wall of bore 60, but when the piston 69 moves to the position indicated in Figure 3, the groove 90 will be in such a position that it will connect opening 89 to passageway 89a. The outer end of passageway 89a is uncovered with the piston 69 as in Figure 2.

At spaced points in the wall of the bore 61 an inlet opening 91 and an outlet opening 91a are formed. The inlet opening 91 is connected to an opening 92 leading from the steam jacket 80. The opening 91a leads to the atmosphere. With piston valve 82 in the position shown in Figure 2, the annular chamber 83 is in communication with exhaust opening 91a and piston 82 covers opening 91. With piston 82 in the position indicated in Figure 3, chamber 83 is in communication with inlet opening 91 and exhaust opening 91a is covered by the piston.

With the piston 82 in the position indicated in Figure 2, steam will exhaust from the left hand end of the cylinder bore 60, through opening 88, passage 87, opening 85, annular chamber 83, and exhaust opening 91a. The piston 82, when in the position indicated in Figure 2, will cover the inlet opening 91. Consequently, steam will not be supplied to the cylinder bore 60.

For controlling movement of the piston valve 82, I provide a valve mounted in an extension 94 (Figures 2 and 3) of the housing 59a. A cylindrical bore 96 is formed in the main portion of the extension 94. The bore 96 receives a piston 97, which is mounted for axial movement therein. The outer end of the piston carries a pair of spaced collars 98, the inner one of which serves to limit inward movement of the piston. The portion of the piston 97 which is disposed in the bore 96 has a large annular chamber 99 formed therein and a small annular chamber 100 formed therein in axial spaced relationship. A steam passageway 103 connects the steam chamber 80 to the annular chamber 99 formed in the piston 97. An exhaust passageway 104 connects the left hand end of bore 96 to the atmosphere. Spaced passageways 105 and 106 communicate with the bore 96 and, when the piston 97 is in the position indicated in Figure 2, the end 107 of the piston covers the end of passageway 105 while the end of passageway 106 communicates with the chamber 99 in the piston. These passageways 105 and 106 are connected to a passageway 108 which is connected to the left hand end of the cylinder bore 61. Axially spaced passageways 109 and 110 communicate with the bore 96 and, when the piston 97 is in the position indicated in Figure 2, the central portion 111 thereof covers the end of passageway 109 and the passageway 110 communicates with the annular chamber 100 of the piston 97. The passageways 109 and 110 are connected to a passageway 112 which is connected to the right hand end of the bore 61. An exhaust passageway 104a leads from the right hand end of bore 96 to the atmosphere.

It will be apparent that with the piston 97 in the position indicated in Figure 2, steam will flow from the chamber 80, through the passageway 103, through annular chamber 99 of piston 97, through passageways 106 and 108, to the left hand end of the bore 61, and will force the piston 82 to the right. At the same time, any steam in the right hand end of the bore 61 will exhaust through passageway 112, passageway 110, annular chamber 100 and exhaust passageway 104a. Thus, the inlet opening 91 will be covered by the piston 82, while the exhaust opening 91a will be uncovered. Consequently, steam from the left hand end of the cylinder bore 60 will exhaust through the opening 88, passageway 87, opening 85, chamber 83 and exhaust opening 91a. Thus, the spring 77 will be permitted to return the piston 69 to the position indicated in Figure 2.

However, if the piston 97 is moved to the right, as indicated in Figure 3, steam will be supplied to the left hand end of the cylinder bore 60 to move the piston 69 to the right. It will be apparent that when the piston 97 is moved to the right, steam will flow from the passageway 103, through the annular chamber 99 in piston 97, through the passageway 109, through passageway 112 (the passageway 110 having its end closed at this time by the portion 111 of the piston) to the right hand end of the bore 61, which will cause the piston 82 to move to the left. At the same time, the steam in the left hand end of the bore 61 will exhaust through the passageway 108, through passageway 105 (the end of passageway 106 being closed by the end 107 of piston 97 at this time) through the left hand end of bore 96 and through passageway 104 to the atmosphere. When the piston 82 is moved to the position indicated in Figure 3, the inlet opening 91 is uncovered while the exhaust opening 91a is covered. Consequently, steam will flow from the chamber 80 through opening 92, through opening 91 into chamber 83, through opening 85, passage 87 and finally through opening 88, into the left hand end of the bore 60. This will force the piston 69 to the right.

When the piston 69 moves to the right sufficiently, the opening 89 communicates with the passageway 89a. This will permit steam to flow from passage 87 into passageway 89a and into the bore 96a which is formed in the upper portion of extension 94. This will force the piston 97a, mounted in bore 96a, from the position indicated in Figure 3, into the position indicated in Figure 2. Movement of the piston 97a to the right (Figure 2) is adapted to move piston 97 to the left to return it to its original position. For this purpose, a short lever 115a is provided which has its upper end in engagement with the outer end of piston 97a, as at 97b, and has a yoke 115b on its lower end which straddles piston 97 between collars 98. The lever 115a is pivoted to the outer end of a pin 117a (Figure 1) which is mounted in extension 94 for axial adjustment and is held in adjusted position by a set screw which engages a flat portion of the pin to prevent rotating thereof. Thus, when piston 97a is moved to the right, piston 97 will be moved to the left. When piston 97 is moved to the right, piston 97a is moved to the left.

The piston 97 must be moved to the right mechanically by means of a lever 115. This will move the piston 69 to the right, as described above. However, as soon as the piston 69 moves sufficiently the piston 97 will be returned to its original position by steam pressure, as described above. Thus, movement of the piston 97 to the right is controlled mechanically while movement of the piston to the left is accomplished automatically by steam pressure.

For moving the piston 97 to the right, I provide the pivoted lever 115, as previously described. This lever has a yoke portion 116 on its upper end which engages the piston 97 between the collars 98, as shown best in Figures 1, 2 and 3. The lever 115 is pivoted to the bifurcated outer end 117 of a plunger 118. The plunger 118 is disposed for axial movement in a bore 120 formed in the housing extension 94. A compression spring 121 is provided in the bore 120 for normally forcing the plunger 118 to the left. A pin 118a is disposed for axial movement in a tube 119a disposed in fixed position in a bore 119 in housing portion 59a. One end of pin 118a engages the plunger 118 while the other end thereof is engaged by the inner end of a screw 118b threaded into a boss 119b formed on the cap 71. It will be apparent that by rotating member 118b, the pivot point for the lever 115 may be adjusted to the right or to the left (Figure 1).

The lower end of the lever 115 is provided with a finger portion 132 which is disposed adjacent the edge of member 26 in alignment with a vertical slot 131 formed therein which is of sufficient width to permit movement of the lever thereinto, if necessary. The finger portion 132 extends downwardly beyond the lower surface of the member 26, when the member 26 is in its uppermost position. Adjustment of the plunger 118 will move the lower end 132 of lever 115 into or out of slot 131, to properly position it at the point where the edge of the cap will be disposed when it is carried on the head 26 in sealing position. The proper position of finger 132 will vary with variations in diameters of the caps being used.

It will be apparent from the above description that I have embodied novel control mechanism in a machine of the type described which is positive and efficient in operation. This control mechanism is of such a nature that it will be actuated whenever a container with a cap thereon is moved into association with the sealing unit. However, it will not be actuated if a container without a cap moves into association with the sealing unit.

Having thus described my invention, what I claim is:

Apparatus of the type described for sealing containers, comprising a support for a container, a sealing member associated with said support, a fluid-actuated unit for moving said sealing member, a valve for controlling the supply of fluid to said fluid-actuated unit, a second valve for controlling the operation of said last-named valve, a control member for actuating said second valve, said control member being so disposed that it will be engaged by a cap on a container positioned on said support to move said second valve into operative position, and means for returning said second valve and said control member to their original positions, said means comprising a fluid-actuated unit, said last-named unit being mechanically connected to said control member.

HARRY E. STOVER.